(12) United States Patent
Santos et al.

(10) Patent No.: US 11,628,808 B1
(45) Date of Patent: Apr. 18, 2023

(54) WIPER ARM HEAD DUAL KNUCKLE

(71) Applicant: Valeo North America, Inc., Troy, MI (US)

(72) Inventors: Eduardo Ribeiro Santos, Troy, MI (US); Roberto Arturo Lechuga, Troy, MI (US); Dattashyam Parthasarathy, Troy, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 17/690,544

(22) Filed: Mar. 9, 2022

(51) Int. Cl.
    *B60S 1/34* (2006.01)
    *B60S 1/38* (2006.01)
    *B60S 1/28* (2006.01)

(52) U.S. Cl.
CPC ............... *B60S 1/3436* (2013.01); *B60S 1/28* (2013.01); *B60S 1/345* (2013.01); *B60S 1/3459* (2013.01); *B60S 1/3497* (2013.01); *B60S 1/38* (2013.01)

(58) Field of Classification Search
CPC .... B60S 1/3409; B60S 1/3436; B60S 1/3438; B60S 1/345; B60S 1/3425; B60S 1/3431; B60S 1/3434; B60S 1/3404; B60S 1/3497; B60S 1/38; B60S 1/28; B60S 1/3459
USPC ........... 15/250.351, 250.352, 250.23, 250.41
See application file for complete search history.

(56) References Cited

U.S. PATENT DOCUMENTS 2,273,817 A * 2/1942 Chellew .................... B60S 1/38
                                       15/250.352
2,890,472 A * 6/1959 Olson ....................... B60S 1/34
                                       15/250.352

FOREIGN PATENT DOCUMENTS

| CN | 201151378 Y | | 11/2008 |
|---|---|---|---|
| CN | 201494409 U | | 6/2010 |
| CN | 103569059 A | | 2/2014 |
| CN | 108674373 A | | 10/2018 |
| DE | 3707233 | * | 9/1988 |
| DE | 4116720 A1 | | 11/1991 |
| GB | 793202 A | | 4/1958 |
| IN | 221MUM2009 A | | 2/2009 |
| JP | H10264772 A | | 10/1998 |
| JP | 2008013006 A | | 1/2008 |
| JP | 4078752 B2 | | 4/2008 |
| KR | 20050022085 A | | 3/2005 |

* cited by examiner

*Primary Examiner* — Gary K. Graham
(74) *Attorney, Agent, or Firm* — Valeo North America, Inc.

(57) ABSTRACT

The present invention relates to a wiper arm head adapted to be connected to a wiper arm body, the wiper arm head comprises: a base end section, a front-end section, and a body section having a pair of left and right side walls longitudinally extending from the base end section towards the front-end section. The wiper arm head comprises a first retainer connection assembly and a second retainer connection assembly formed integrally with the wiper arm head and configured to connect the wiper arm head to the wiper arm body, which comprises a first retainer and a second retainer to hold a first wiper blade and a second wiper blade respectively.

17 Claims, 9 Drawing Sheets

WIPER ARM HEAD DUAL KNUCKLE

TECHNICAL FIELD

The present invention relates to a windshield wiper assembly for a motor vehicle. In particular, the present invention relates to a wiper arm head of the windshield wiper assembly of a motor vehicle.

BACKGROUND OF THE INVENTION

Automobiles are conventionally equipped with a windscreen wiper system to ensure that the windscreen is washed and that the driver's view of his environment is not disturbed. This wiper system usually consists of a wiper arm, which moves back and forth at an angle, and elongated wiper blades, which carry wiper strips made of elastic material. These strips rub against the windscreen and evacuate water, dust, ice, snow etc. out of the driver's field of vision. The wiper arm is comprised of an arm head and an arm main body, which is pivotally attached to the arm head around a connecting shaft. The arm head is a member linked to drive means of the wiper system and includes a connection section to which a drive shaft is connected. Existing wiper arm heads of the wiper arms can accommodate a single retainer, a single c-bow and a single spring fixed to a single wiper blade. With the trend in modern vehicles, for example, passenger vehicles utilizing greatly extended windshields glass area, it is necessary to ensure good wiping performance. Extended windshields generally have increased dimensions compared to normally used windshields. For such windshields, in order to perform wiping operation, it may be required to use two-wiper arm systems to cover a wider wiper area or it may be required to use a single wiper arm with a longer wiper blade, for instance of about 1.3 m length to 1.7 m length, to cover the wider wiper area while following the regulation standards. Further, to operate the two-wiper arm systems, it may be needed to employ more than one wiper motor and the wiper linking mechanism. In addition, in order to enable a flat blade aqua technology, the blade length must not exceed a length of about 1 m, as the flat blades do not have a superstructure like conventional pin blades so the stiffness (lateral bending) as well as the ability to apply pressure distribution is compromised.

BRIEF SUMMARY OF THE INVENTION

An object of the invention is to alleviate the problems raised by the prior arts. To be more precise, an object of the invention is to provide a simple wiper system that can perform wiping of windshields having wider wiping area by using a single wiper arm having a single wiper arm head, which can accommodate two retainers for holding two wiper blades.

Another object of the present invention is to provide a single wiper arm having a dual knuckle wiper arm head, which can accommodate different types of wiper blades such as aqua wiper blades and non-aqua wiper blades.

To achieve these objectives, the present invention provides a wiper arm head adapted to be connected to a wiper arm body. According to an embodiment of the present invention, the wiper arm head comprises: a base end section, a front end section, and a body section having a pair of left and right side walls longitudinally extending from the base end section towards the front end section; a first retainer connection assembly and a second retainer connection assembly formed integrally with the wiper arm head and configured to connect the wiper arm head to the wiper arm body, which comprises a first retainer and a second retainer; the first retainer connection assembly comprises a first protruding section protruding from the front end section and is formed with a first hinge shaft extending along its longitudinal direction from a first sidewall to a second sidewall of the first protruding section and it comprises a first throughhole to connect a proximal end portion of the first retainer with the wiper arm head through a first hinge pin disposed in the first through-hole; and the second retainer connection assembly comprises a second protruding section protruding from the first protruding section and positioned downward of the first hinge shaft, and the second protruding section comprises: a second hinge shaft extending between a pair of second arm sections disposed at a predetermined interval, and having a second through-hole extending from one second arm section to the other second arm section through the second hinge shaft along its longitudinal direction to connect a proximal end portion of the second retainer with the wiper arm head through a second hinge pin disposed in the second through-hole.

In an embodiment, the first retainer connection assembly further includes a pair of first arm sections disposed at a predetermined interval and protrudes from the front end face through the first protruding section and extends forward through the first hinge shaft, and wherein each first arm section is provided with a first aperture at a position deviated downward and rearward of the first hinge shaft to receive a first spring pin.

In an embodiment, the first and second sidewalls of the first protruding section extend forward from portions slightly inside of the right and left side walls of the body section of the wiper arm head to be in substantially parallel with the left and right and left sidewalls, respectively.

In an embodiment, an arm section of the pair of first arm sections is positioned slightly inside the right sidewall of the body section and it is the first sidewall of the first protruding section. Further, another arm section of the pair of first arm sections is positioned in such a way that the second protruding section is formed at a position deviated sideward and rearward of the other arm section along a lateral direction of the first protruding section.

In an embodiment, the first spring pin is positioned rearward and downward of the first hinge shaft.

In an embodiment, the first spring pin is adapted to connect the wiper arm head with the first retainer by means of a first elongated spring member, which is housed in the first retainer, and wherein one end of the first elongated spring member is coupled to the first spring pin via a first connecting means and other end of the first elongated spring member is coupled to a distal end section of the first retainer.

In an embodiment, the first protruding section extends forward from the front end section such that the sidewalls of the first protruding section are slightly inside the left and right side walls of the body section.

In an embodiment, the second protruding section is formed slightly inside the second sidewall of the first protruding section.

In an embodiment, each second arm section is provided with a second aperture provided at a position deviated downward and rearward of the second hinge shaft to receive a second spring pin. The second spring pin is positioned rearward and downward of the second hinge shaft.

In an embodiment, the second spring pin is adapted to connect the wiper arm head with the second retainer by means of a second elongated spring member, which is housed in the second retainer, and wherein one end of the second elongated spring member is coupled to the second spring pin via a second connecting means and other end of the second elongated spring member is connected to an adapter via a wiper rod, wherein the second wiper blade is mounted to the adapter.

In an embodiment, the second hinge shaft has a lesser longitudinal length compared to a longitudinal length of the first hinge shaft.

In an embodiment, the second retainer is housed within the first retainer.

In an embodiment, the base end section has an opening to receive a drive shaft.

In an embodiment, the first retainer and the second retainer are of different types.

In an embodiment, the first retainer connection assembly is configured to engage a first wiper blade against a first wiping zone of a windshield, and the second retainer connection assembly configured to engage a second wiper blade against a second wiping zone different from the first wiping zone.

According to another embodiment, the present invention provides a wiper arm assembly comprising: a wiper arm head formed with a first retainer connection assembly and a second retainer connection assembly; a wiper arm body rotatably connected to the wiper arm head through the first retainer connection assembly and the second retainer connection assembly; a first wiper blade; a second wiper blade, and the first wiper blade and the second wiper blade are arranged to be in parallel a blade guide connecting a distal end portion of the second wiper blade to a proximal end portion of the first wiper blade. The wiper arm body comprises: a first retainer adapted to be connected to the wiper arm head through the first retainer connection assembly; a second retainer adapted to be connected to the wiper arm head through the second retainer connection assembly; a first elongated spring arranged between the first retainer connection assembly and the first wiper blade, which is adapted to wipe a first wiping zone of a windshield; and a second elongated spring arranged between the second retainer connection assembly and a second wiper blade via a wiper rod and an adapter, wherein the second wiper blade is adapted to wiper a second wiping zone of the windshield, the second wiping zone is different from the first wiping zone.

According to one characteristic of the present invention, the wiper arm head comprises: a base end section, a front end section, and a body section having a pair of left and right walls longitudinally extending from the base end section towards the front end section; the first retainer connection assembly comprises a first protruding section protruding from the front end section and is formed with a first hinge shaft extending from a first sidewall to a second sidewall of the first protruding section and it comprises a first through-hole to connect a proximal end portion of the first retainer with the wiper arm head through a first hinge pin disposed in the first through-hole; and the second retainer connection assembly comprises a second protruding section protruding from the first protruding section and positioned downward of the first hinge shaft, and the second protruding section comprises: a second hinge shaft extending between a pair of second arm sections disposed at a predetermined interval, and having a second through-hole extending from one second arm section to the other second arm section through the second hinge shaft along its longitudinal direction to connect a proximal end portion of the second retainer with the wiper arm head through a second hinge pin disposed in the second through-hole.

According to one characteristic of the present invention, the first wiper blade is a non-aqua blade and the second wiper blade is aqua blade and vice versa.

BRIEF DESCRIPTION OF THE DRAWINGS

To complete the description and to provide a better understanding of the invention, a set of drawings is provided. Said drawings form an integral part of the description and illustrate an embodiment of the invention, which should not be construed as restricting the scope of the invention, but only as an example of how the invention can be carried out. The drawings comprise the following characteristics.

FIG. 6d shows an enlarged portion of the blade guide connecting the first wiper blade and the second wiper blade shown in FIG. 6a.

DETAILED DESCRIPTION OF THE INVENTION

Hereinafter, embodiments of the present invention will be described based on the accompanying drawings. It should first of all be noted that while the figures explain the invention in detail for its implementation, they can of course be used to better define the invention as necessary. Likewise, it should be recalled that, for all of the figures, the same elements are designated by the same references.

The terminology used herein is for the purpose of describing embodiments and is not intended to be limiting and/or restrictive of the disclosure.

In addition, the same reference numerals or symbols shown in the drawings of the present disclosure indicate elements or components that perform substantially the same function.

It should be noted that the singular forms "a," "an," and "the" are intended to include the plural forms as well, unless the context clearly indicates otherwise.

Also, it will be understood that, although the terms first, second, etc. may be used herein to describe various elements, the elements are not limited by these terms. These terms are only used to distinguish one element from another.

Figure 1:
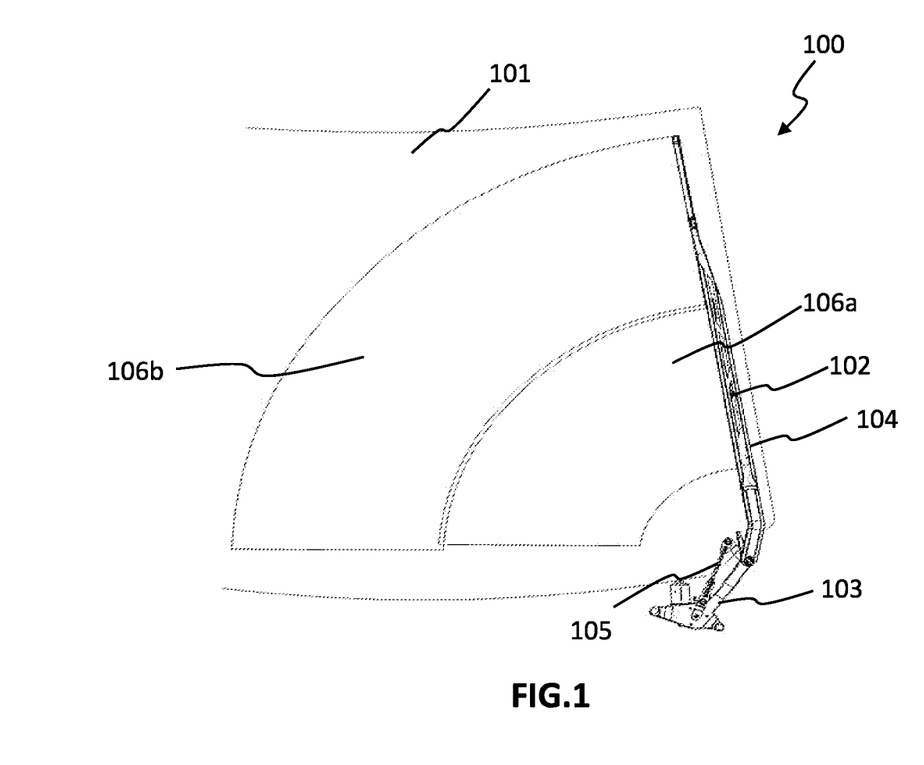
FIG. 1 shows a perspective view of a windshield cleaning system of a motor vehicle, according to an embodiment of the present invention.
Figure 2:
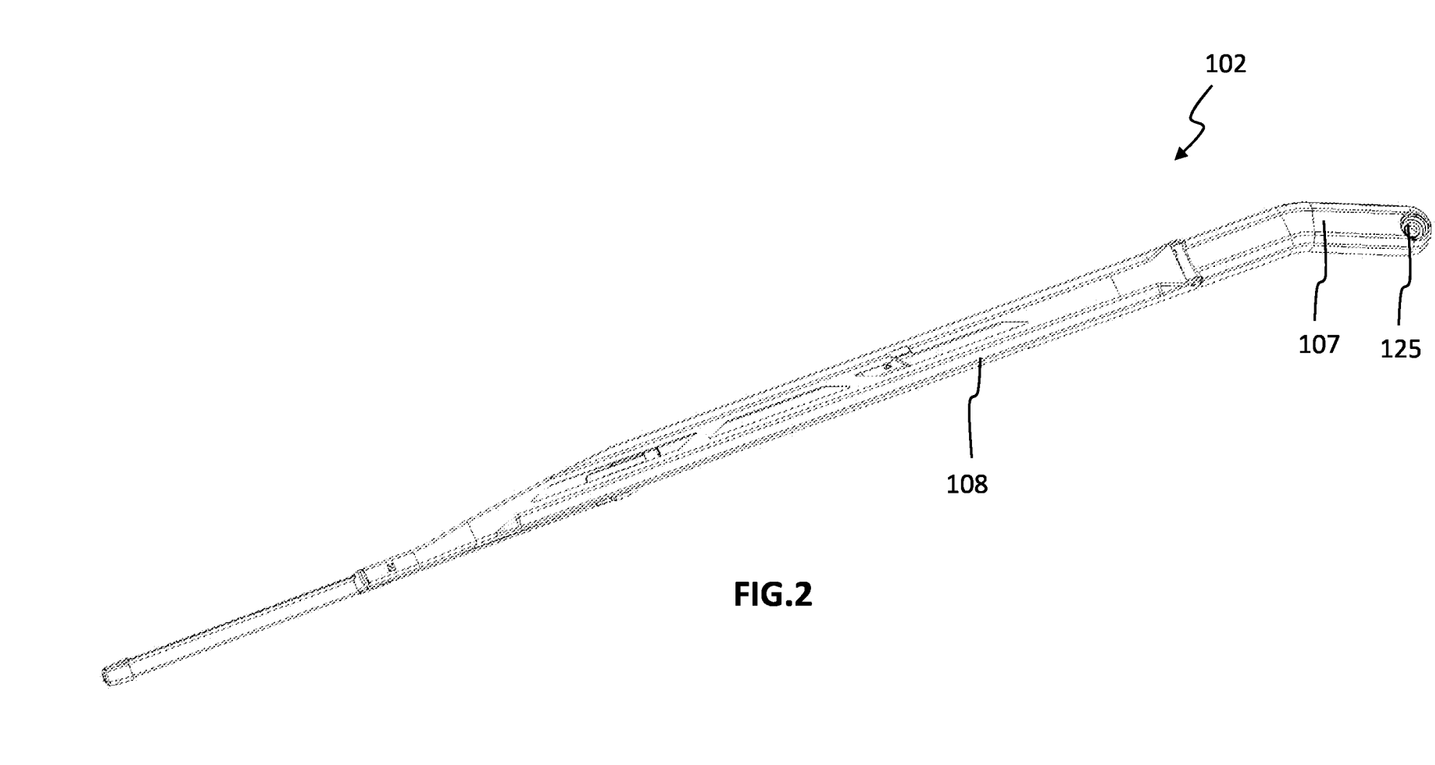
FIG. 2 shows a perspective view of a wiper device for cleaning a windshield of the motor vehicle, according to an embodiment of the present invention.
Figure 3:
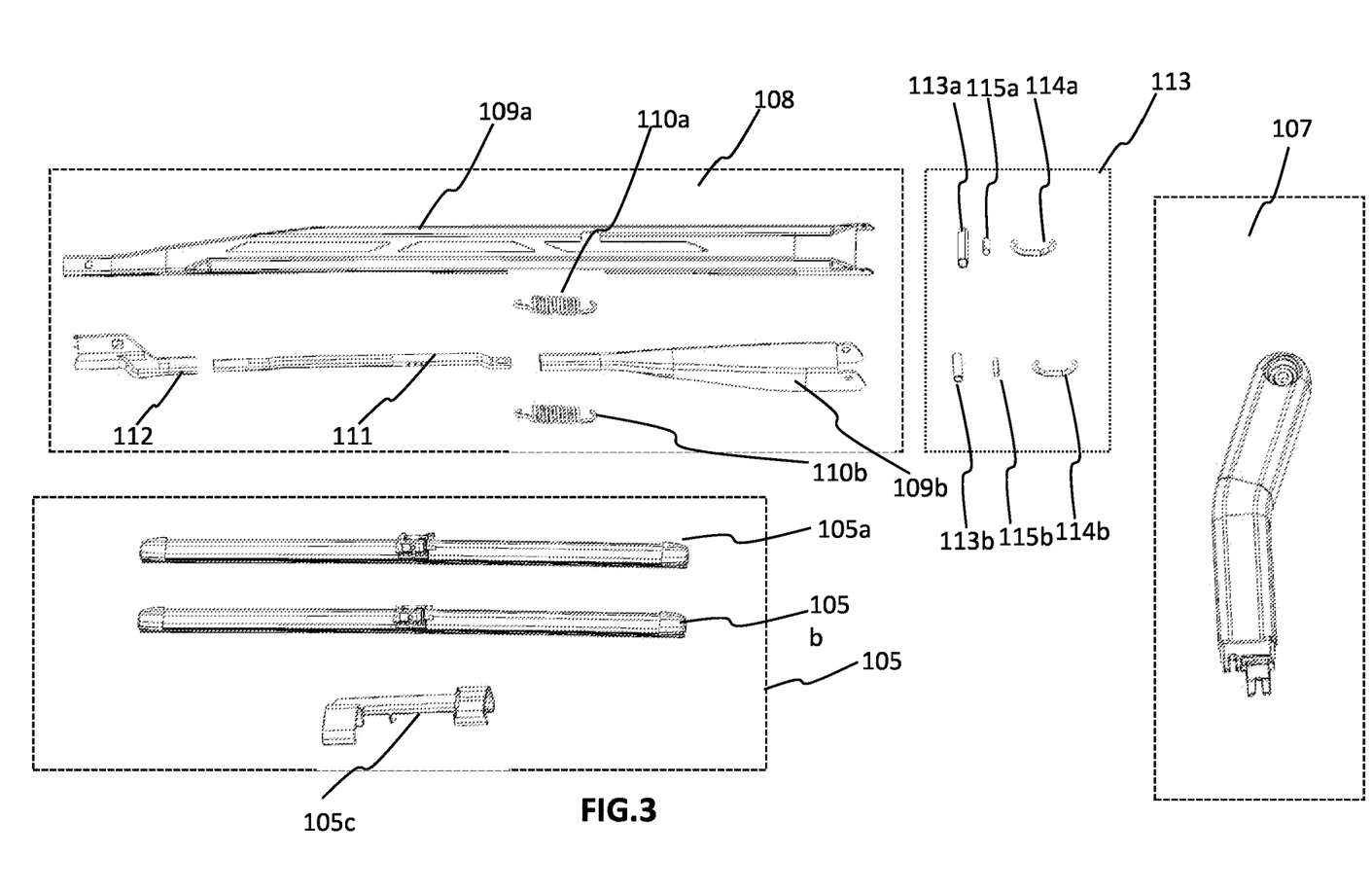
FIG. 3 shows the constituent parts of the wiper device of FIG. 2.

FIG. 1 shows a perspective view of a windshield cleaning system of a motor vehicle, according to an embodiment of the present invention. FIG. 2 shows a perspective view of a wiper device for cleaning a windshield of the motor vehicle, according to an embodiment of the present invention, and FIG. 3 shows the constituent parts of the wiper device of FIG. 2.

As illustrated in the FIG. 1, the windshield cleaning system 100 comprises a windshield 101, which comprises an external windshield surface that receives rain or dirt, such as insect impacts for example, when the vehicle is in motion. The windshield cleaning system further includes a wiper device 102 for performing the wiping of the windshield 101. The wiper device 101 may be fixed to a wiper shaft 103 as shown in the FIG. 1. The wiper device 101 according to an embodiment of the present invention may comprises a pair of wiper blades (clearly shown in FIG. 3) and a single wiper arm assembly 104 for supporting the pair of wiper blades. Further, the windshield cleaning system 100 comprises a windscreen wiper drive linkage 105 for rotational drive of the wiper arm 104. The wiper shaft 103 may be connected to a wiper motor (not shown in the Figures) via the windscreen wiper drive linkage 105. The windscreen wiper drive linkage 105 may be provided for moving the wiper arm 104 between an in wipe position, an out wipe position and a parked position. The pair of wiper blades are placed in abutment with the windscreen 101, such that the wiper blades are capable of wiping the windscreen 101. During the operation of the windshield cleaning system 100, a first wiper blade 105a (clearly shown in FIG. 3 and FIG. 6a) of the pair of wiper blades 105a, 105b may be adapted to wipe a first wiping zone 106a of the windshield 101. Further, a second wiper blade 105b of the pair of wiper blades 105a, 105b may be adapted to wipe a second wiping zone 106b different from the first wiping zone 106a of the windshield 101. In an embodiment, the first wiping zone 106a and the second wiping zone 106b constitutes the complete area of the windshield 101. Unlike the conventional wiper devices, the wiper device 101 of the present invention is capable of providing a wider wiper coverage by using a single wiper arm 104, and a single wiper motor. The wiper device 101 of the present invention is discussed in detail with respect to FIG. 2. In another embodiment, the wiper arm assembly 104 as previously mentioned may be arranged on both passenger side and driver side such that the cleaning of a wider windshield can be performed more effectively. For instance, a driver side wiper arm assembly (not shown in Figures) and the passenger side wiper arm assembly (not shown in the figures) operate together to perform the cleaning of the complete portion of the windshield. It should be understood to a person skilled in the art that more than one wiper arm assembly could be arranged to perform cleaning of different portions of the windshield of the vehicle.

FIG. 2 shows a perspective view of a wiper device for cleaning a windshield of the motor vehicle, according to an embodiment of the present invention. FIG. 3 shows the constituent parts of the wiper device of FIG. 2. As previously discussed, the wiper device 102 comprises a single wiper arm assembly 104 and a blade assembly 105 supported by the single wiper arm assembly 104. Hereinafter, the terms 'the wiper arm assembly' and 'the wiper arm' may be used interchangeably for the purpose of the explanation. As illustrated in the FIG. 2, the wiper arm 104 includes a wiper arm head 107 and a wiper arm main body 108, which may be rotatably connected to the wiper arm head 107. As seen in FIG. 3, the wiper arm assembly 104 includes a first retainer 109a, a first elongated spring member 110a, a second retainer 109b, and a second elongated spring member 110b, a wiper rod 111, and an adapter 112. As known to a person skilled in the art, the retainers 109a, 109b are members having U-shaped cross section including a top wall portion and a pair of sidewalls portions extending from both sides of the top wall portion toward the wiped surface side, respectively. In an embodiment, the first and second retainers 109a, 109b are of different types and are of different sizes. For instance, the second retainer 109b is sized in such a way that the second retainer 109b may be adapted to be housed within the first retainer 109a. The wiper device 102 also comprises a connecting assembly for engaging the wiper arm head 107 with the wiper arm main body 108. The connecting assembly 113 comprises a first hinge pin 113a, a first connecting member 114a, a first spring pin 115a, a second hinge pin 113b, a second connecting member 114b and a second spring pin 115b. The first connecting means 114a and the second connecting means 114b may be U-shaped hook members and these are known to a person skilled in the art. As previously discussed, the blade assembly 105 of the wiper device 102 includes the pair of wiper blades 105a, 105b comprising the first wiper blade 105a and the second wiper blade 105b. The blade assembly 105 also includes a blade guide 105c engaging the first wiper blade 105a and the second wiper blade 105b. For instance, the blade guide 105c is a plastic connector. In an embodiment, the first wiper blade 105a and the second wiper blade 105b have the same structure. For instance, the length of the first wiper blade 105a is the same as the length of the second wiper blade 105b. Further, in an aspect, the first wiper blade 105a and the second wiper blade 105b are aqua blades. In another aspect, the first wiper blade 105a and the second wiper blade 105b are non-aqua blades. Yet, in another aspect, the first wiper blade 105a is an aqua blade and the second wiper blade 105b is a non-aqua blade, and vice versa.

Figures 4A, 4B:
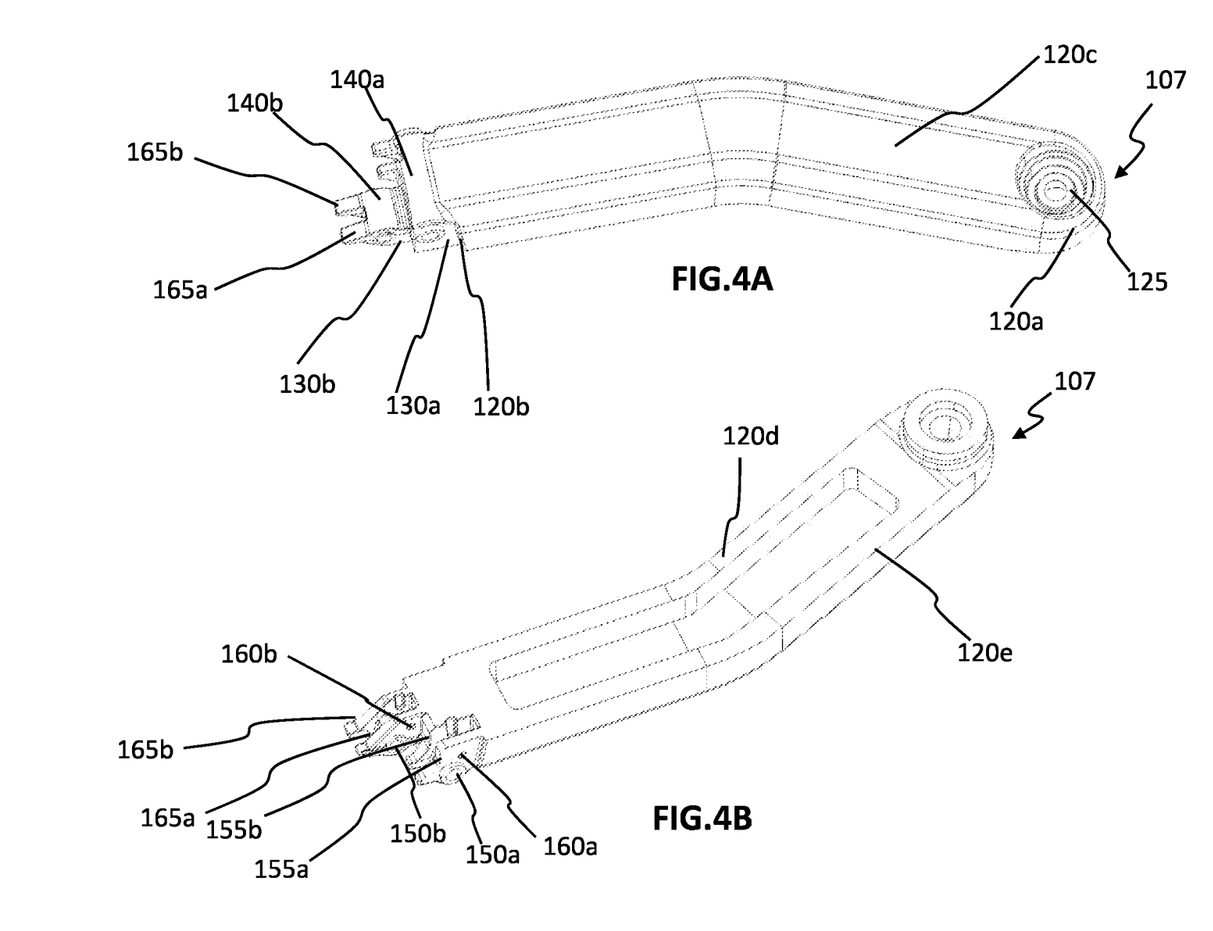
FIG. 4a, FIG. 4b, FIG. 4c and FIG. 4d shows different views of a wiper arm head of the wiper device shown in FIG. 2, according to an embodiment of the present invention.
Figure 4C:
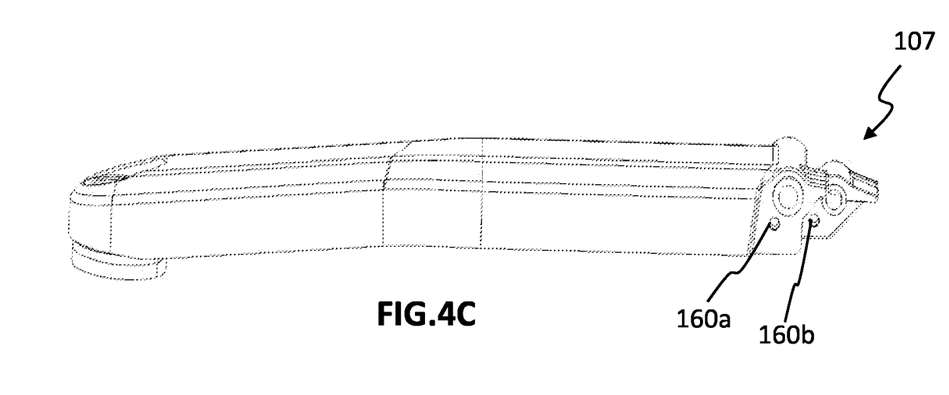
Figure 4D:
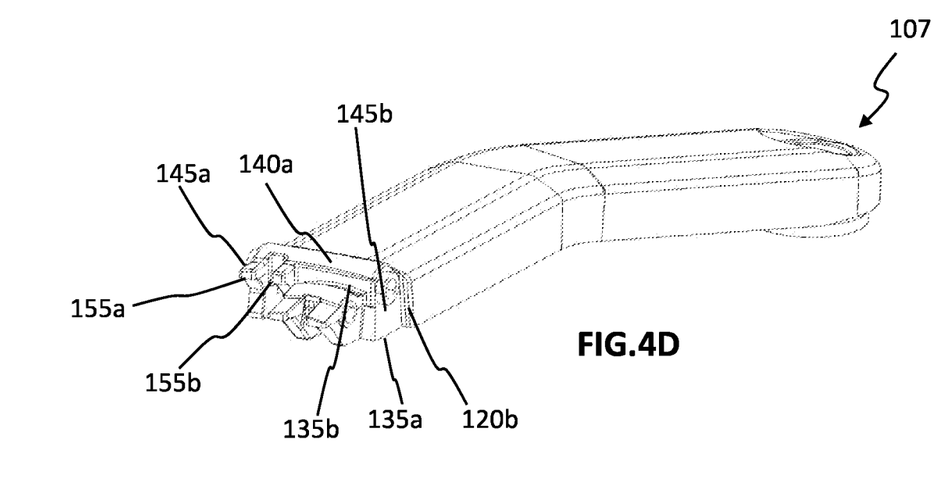

As previously indicated, the wiper arm main body 108 is rotatably connected to the wiper arm head 107 by means of the connecting assembly 113. Different views of the wiper arm head 107 is shown in the FIG. 4a, the FIG. 4b, the FIG. 4c, and the FIG. 4d. The wiper arm head 107 according to an embodiment of the present invention comprises a base end section 120a, a front-end section 120b, and a body section 120c having a pair of left and right side walls 120d, 120e longitudinally extending from the base end section 120a towards the front-end section 120b. As can be seen from the FIG. 4a FIG. 4b, FIG. 4c and FIG. 4d, the base end section 120a has an opening 125 to receive a drive shaft (not shown in the Figures). Unlike the conventional wiper arm heads, the wiper arm head 107 of the present invention may be formed with a pair of knuckles, i.e., dual knuckles, also referred to as a first retainer connection assembly 130a and a second retainer connection assembly 130b, respectively. The first retainer connection assembly 130a and the second retainer connection assembly 130b may be formed integrally with the front-end section 120b of the wiper arm head 107 and are configured to engage the wiper arm head 107 with the wiper arm body 108 with the aid of the connecting assembly 113. As can be seen from FIG. 4a, FIG. 4b, FIG. 4c, and FIG. 4d, the first retainer connection assembly 130a may be shifted from the second retainer connection assembly 130b. The first retainer connection assembly 130a may be configured to engage the first wiper blade 105a to wipe the first wiping zone 106a of a windshield 101, and the second retainer connection 130b assembly may be configured to engage the second wiper blade 105b to wipe the second wiping zone 106b. In an aspect, the first wiping zone 106a and the second wiping zone 106b may be different wiping areas. In another aspect, the first wiping zone 106a and the second wiping zone 106b may have equal wiping areas.

The first retainer connection assembly 130a comprises a first protruding section 135a (clearly shown in FIG. 4d) protruding from the front-end section 120b and is formed with a first hinge shaft 140a extending along its longitudinal direction from a first sidewall 145a to a second sidewall 145b (clearly shown in FIG. 4d) of the first protruding section 135a. As can be seen from the FIG. 4b and FIG. 4d, the first and second sidewalls 145a, 145b of the first protruding section 135a extends forward from portions slightly inside of the right and left side walls 120d, 120e of the body section 120c of the wiper arm head 107 to be in substantially parallel with the left and right side walls 120d, 120e, respectively. The first hinge shaft 140a comprises a first through-hole 150a (clearly shown in FIG. 4b) to connect a proximal end portion of the first retainer 109a with the wiper arm head 107 through the first hinge pin 113a disposed in the first through-hole 150a. The first retainer 109a may be arranged in a substantially straight line with the arm head 107. The first retainer connection assembly 130a further includes a pair of first arm sections 155a, 155b (shown in FIG. 4d) disposed at a predetermined interval and protrudes from the front-end section 120b through the first protruding section 130a and extends forward through the first hinge shaft 140a. Each first arm section 155a may be provided with a first aperture 160a at a position deviated downward and rearward of the first hinge shaft 145a to receive the first spring pin 115a, which is positioned rearward and downward of the first hinge shaft 145a.

Figure 7:
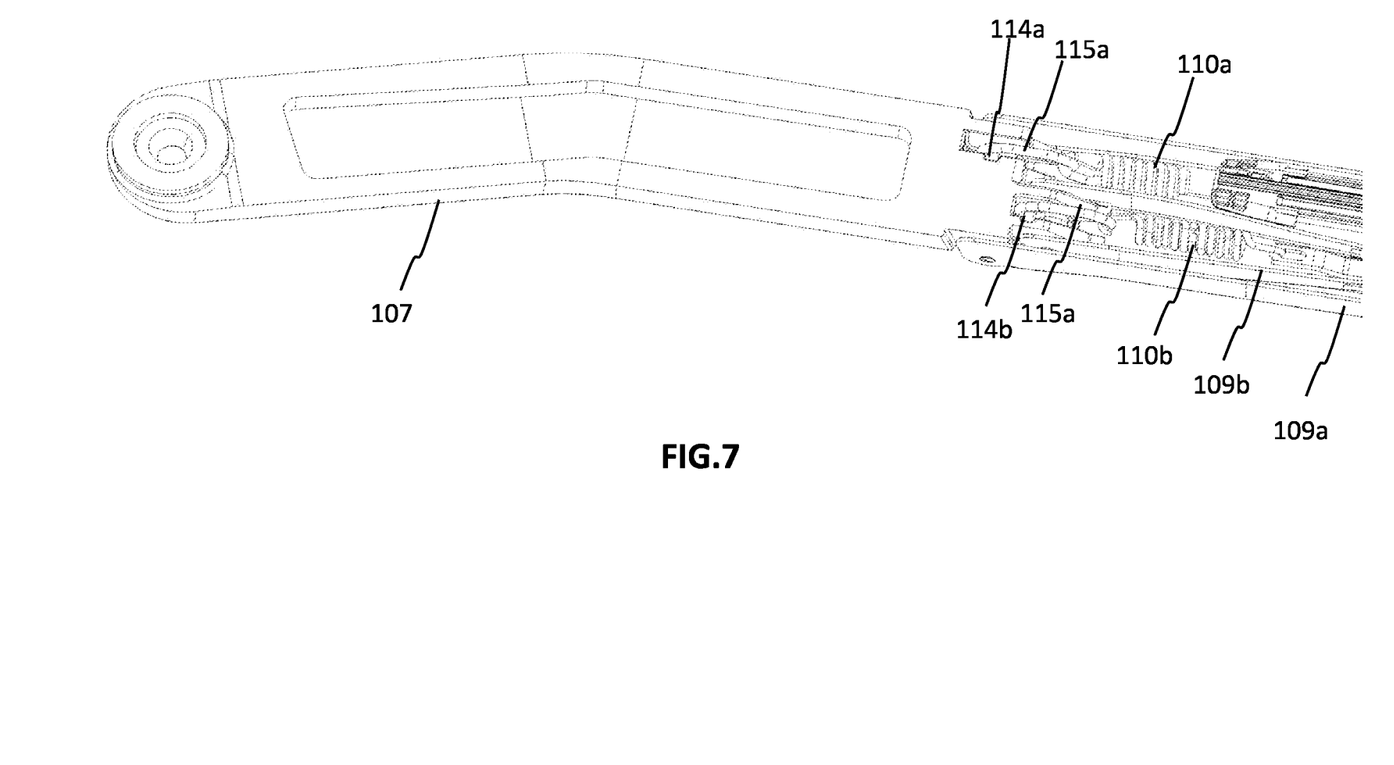
FIG. 7 shows a connection between the wiper arm head and two retainers of the wiper device of FIG. 2, according to an embodiment of the present invention

As can be seen from FIG. 7, in an embodiment, the first spring pin 115a may be adapted to connect the wiper arm head 107 to the first elongated spring member 110a, which is housed in the first retainer 109a. One end of the first elongated spring member 110a may be coupled to the first spring pin 115a via a first connecting means 114a and other end of the first elongated spring member 110a may be coupled to a distal end section of the first retainer 109a. The first elongated spring member 110a may be for urging the first wiper blade 105a against the first wiping zone 106a during the operation of the windshield cleaning system 100. Without limitation, the first elongated spring member 110a can apply a spring force between 400 N/m to 850 N/m It should be understood to a person skilled in the art that range of spring forces that can be applied by the elongated spring members may vary depending on the length of the arms.

The second retainer connection assembly 130b comprises a second protruding section 135b (clearly shown in FIG. 4d) protruding from the first protruding section 130a and positioned downward of the first hinge shaft 145a. The second protruding section 135b may be formed slightly inside the second sidewall 145b of the first protruding section 135a. The second protruding section 135b comprises the second hinge shaft 140b, which has a lesser longitudinal length compared to a longitudinal length of the first hinge shaft 140a. The second hinge shaft 140b extends between a pair of second arm sections 165a, 165b (see FIG. 4a and FIG. 4b) disposed at a predetermined interval, and having a second through-hole 160b extending from one second arm section 165a to the other second arm section 165b through the second hinge shaft 140b along its longitudinal direction to connect a proximal end portion of the second retainer 109b with the wiper arm head 107 through the second hinge pin 113b disposed in the second through-hole 160b. The second retainer 109b may be arranged in a substantially straight line with the arm head 107 and housed within the first retainer 109a. Each second arm section 165a, 165b may be provided with a second aperture 160b provided at a position deviated downward and rearward of the second hinge shaft 140b to receive the second spring pin 115b. The second spring pin 115b may be positioned rearward and downward of the second hinge shaft 104b. In an embodiment, the second spring pin 115b may be adapted to connect the wiper arm head 107 to the second elongated spring member 110b, which is housed in the second retainer 109b. One end of the second elongated spring member 110b may be coupled to the second spring pin 115b via the second connecting means 114b and other end of the second elongated spring member 110b may be connected to an adapter 112 via the wiper rod 111, and the second wiper blade 105b is mounted to the adapter 112. The wiper rod 111 may be a rod-shaped member extending from the other side of the second retainer 109b. The second elongated spring member 110b may be for urging the second wiper blade 105b against the second wiping zone 106b during the operation of the windshield cleaning system 100. Without limitation, the second elongated spring member 105b can apply a spring force between 150 N/m to 500 N/m. In an aspect, length of the second elongated spring member 110b may be the same as the length of the first elongated spring member 110a. In another aspect, the length of the first elongated spring member 110a may be different from the length of the second elongated spring member 110b. It should be understood to a person skilled in the art that the amount of force exerted at the center of each wiper blade 105a, 105b is the same in this exemplary design, as the wiper blades 105a, 105b happen to have same length.

As can be seen from FIG. 4a, FIG. 4b, FIG. 4c, and FIG. 4d, an arm section 155a of the pair of first arm section 155a, 155b of the first retainer connection assembly 130a may be positioned slightly inside the right sidewall 120e of the body section 120b and it is the first sidewall 145a of the first protruding section 135a. Further, another arm section 155b of the pair of first arm sections 155a, 155b of the first retainer connection assembly 130a may be positioned in such a way that the second protruding section 130b is formed at a position deviated sideward and rearward of the other arm section 115b along a lateral direction of the first protruding section 130a.

Figure 5A:
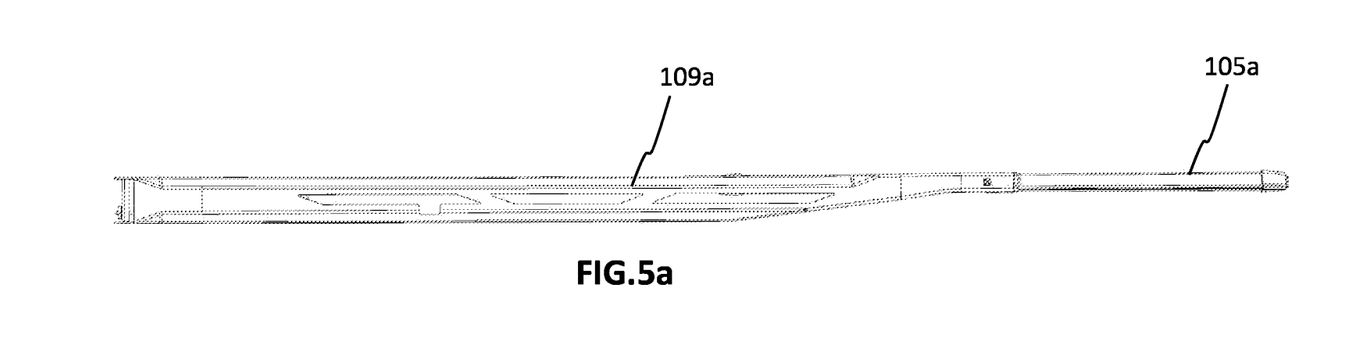
FIG. 5a shows a perspective view of a first retainer holding a first wiper blade, according to an embodiment of the present invention.
Figure 5B:
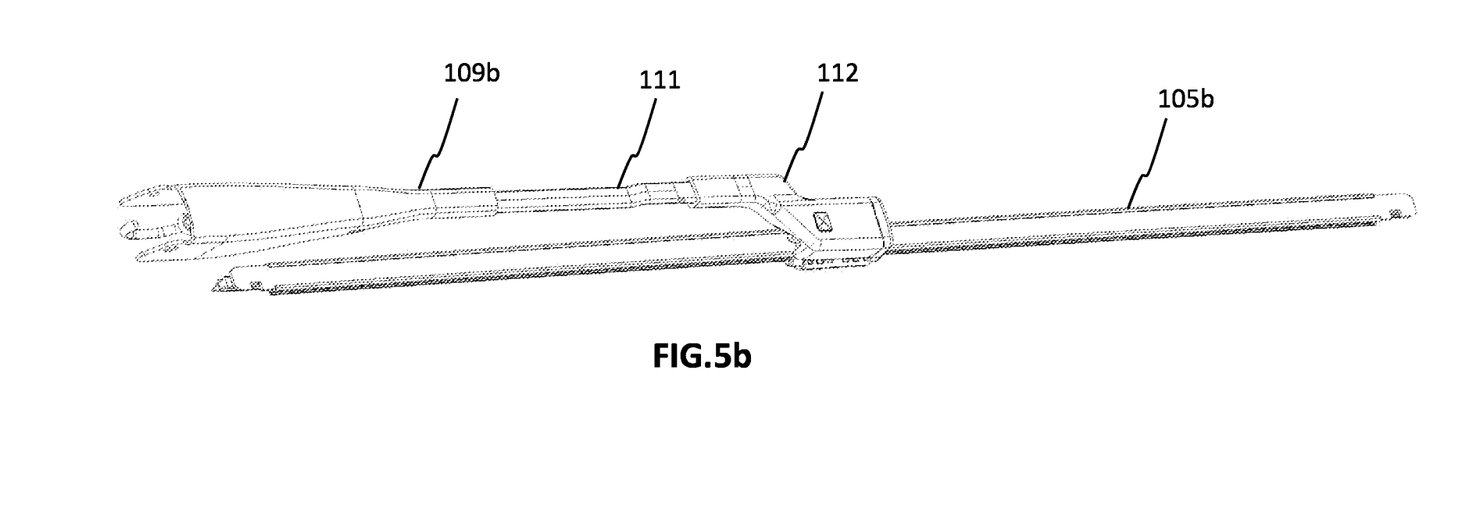
FIG. 5b shows a perspective view of a second retainer holding a second wiper blade of the wiper device of the FIG. 2, according to an embodiment of the present invention.

FIG. 5a shows a perspective view of a first retainer holding a first wiper blade of the wiper device of the FIG. 1, according to an embodiment of the present invention. FIG. 5b shows a perspective view of a second retainer holding a second wiper blade of the wiper device of the FIG. 2, according to an embodiment of the present invention. As previously discussed, the distal end portion of the first retainer 109a may be engaged with the first wiper blade 105a and whereas the proximal end portion of the first retainer 109b may be engaged with the wiper arm head 107 by means of the first retainer connection assembly 130a. During operation of the windshield cleaning system 100, the first wiper blade 105a may urge against the glass contact surface of the first wiping zone 106a of the windshield to clean the first wiping zone 106a. Further, the adapter 112 may be fixed to the second retainer 109b via the wiper rod 111 and the adapter 112 may be engaged with the second wiper blade 105b and whereas the proximal end portion of the second retainer 109b is engaged with the wiper arm head 107 by means of the second retainer connection assembly 130b. During operation of the windshield cleaning system, the second wiper blade 105b may urge against the glass contact surface of the second wiping zone 106b of the windshield to clean the second wiping zone 106b.

Figure 6A:
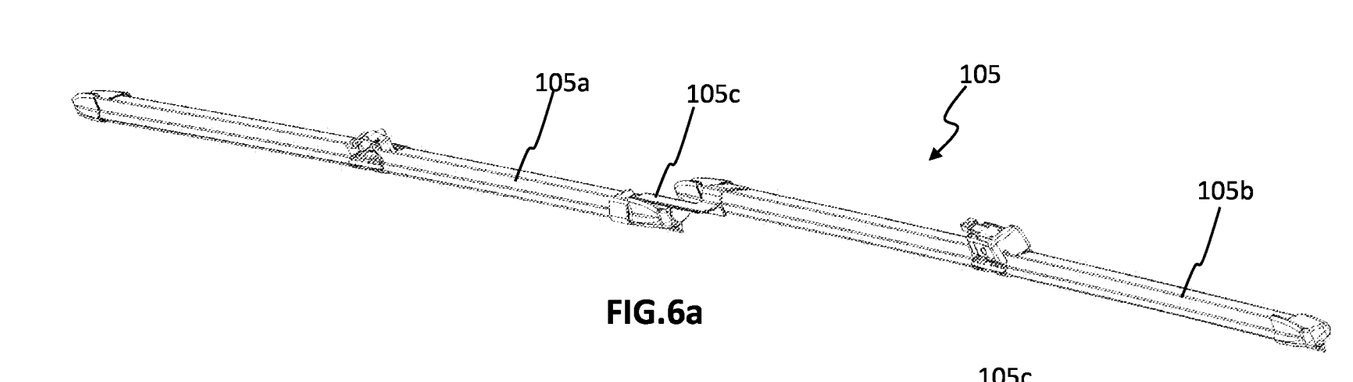
FIG. 6a shows a perspective view of a first wiper blade connected to a second wiper blade of the wiper device of the FIG. 2, according to an embodiment of the present invention.
Figure 6B:
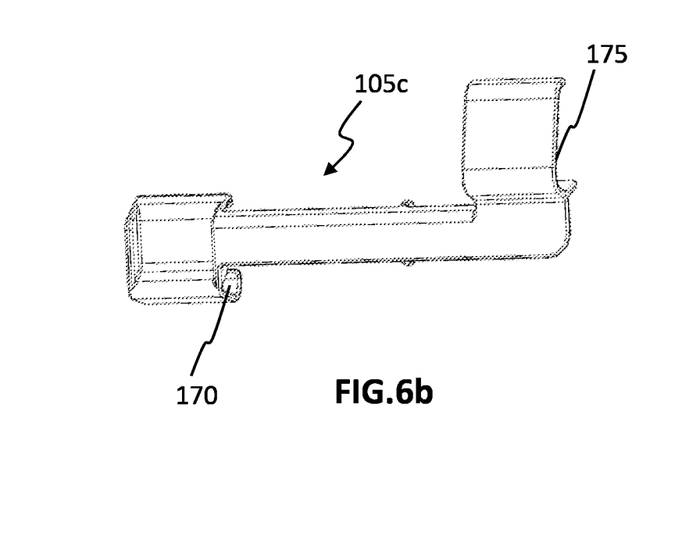
FIG. 6b and FIG. 6c show different views of a blade guide engaging the first wiper blade and the second wiper blade, according to an embodiment of the present invention.
Figure 6C:
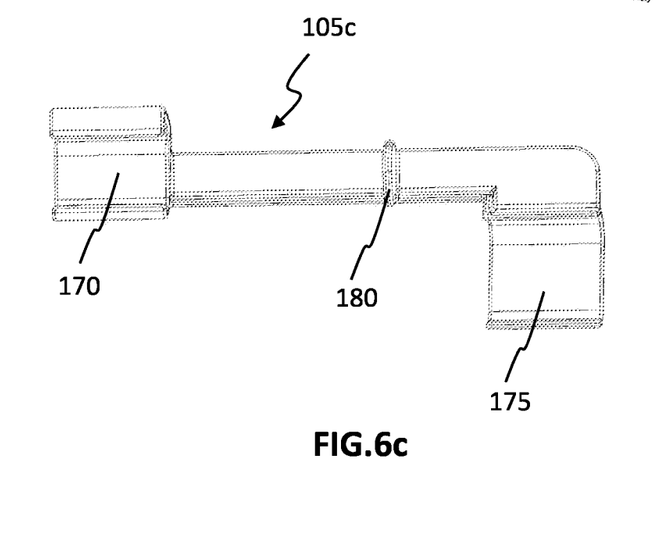
Figure 6D:
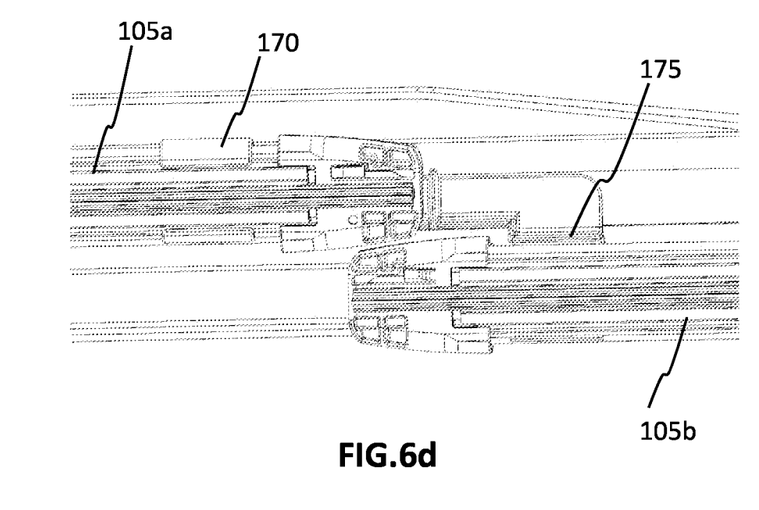

FIG. 6a shows a perspective view of a first wiper blade connected to a second wiper blade of the wiper device of the FIG. 2, according to an embodiment of the present invention. FIG. 6b and FIG. 6c show different views of a blade guide engaging the first wiper blade and the second wiper blade, according to an embodiment of the present invention. FIG. 6d shows an enlarged portion of the blade guide connecting the first wiper blade and the second wiper blade shown in FIG. 6a. The blade guide 105c may be a plastic connector connecting the first wiper blade 105a and the second wiper blade 105b. In particular, as can be seen in the FIG. 6a, the distal end portion of the first wiper blade 105a is connected to the proximal end portion of the second wiper blade 105b. As can be seen from FIG. 6a, the first wiper blade and the second wiper blade are arranged to be in parallel. In one aspect, the length of the first wiper blade 105a and the length of the second wiper blade 105b may be the same. In another aspect, the length of the first wiper blade 105a and the second wiper blade 105b may be different. For instance, the lengths of the first wiper blade and the second wiper blade is about 0.69 m. However, it is understood to a person skilled in the art that the blade lengths can be varied based on the area to be wiped. As illustrated in FIG. 6b and FIG. 6c, the blade guide 105c comprises: a first holding means 170 to hold the distal end portion of the first wiper blade 105a, a second holding means 175 to hold the proximal end portion of the second wiper blade 105b, and a stopping means 180 to prevent the movement of the first wiper blade 105a during the operation of the windshield cleaning system 100. Advantageously, the blade guide 105c may help to prevent the clash between the first wiper blade 105a and the second wiper blade 105b during the operation of the windshield cleaning system 100.

During the operation of the windshield cleaning system 100, the motor may be operated to rotate the wiper arm head, 107 which in turn results in moving the first wiper blade 105a and the second wiper blade 105b to and from to sweep the first wiping zone 106a and the second wiping zone 106b, respectively. Thus, the wiper arm head 107 of the present invention is structured in such a way that the arm head 107 can accommodate two retainers 109a, 109b for holding two wiper blades 105a, 105b. Thereby, the wiper device 102 of the present invention employs a single wiper arm 104 with two blades 105a, 105b to provide a greater wiper coverage or the full vision zone area. Hence, the wiper device 102 of the present invention avoids the use of multiple arm heads, multiple pivot housings and multiple motors for performing the wiping of the windshields having wider wiping area compared to the conventional windshields. Further, the wiper device 102 of the present invention is suitable for both aqua and non-aqua blades, as the wiper blades 105a, 105b can be provided with or without the aqua functionality. In addition, the wiper device 102 of the present invention allows using blades having smaller lengths that are common to passenger vehicle applications, as opposed to longer blade lengths that are common to larger commercial vehicles. Hence, resulting in better performance and serviceability experience for the passenger vehicles.

According to another embodiment of the present invention, there is provided a wiper arm assembly 104 having a wiper arm head 107 formed with a first retainer connection assembly 130a and a second retainer connection assembly 130b; a wiper arm body 108 rotatably connected to the wiper arm head 107 through the first retainer connection assembly 130a and the second retainer connection assembly 130b; a first wiper blade 105a; and a second wiper blade 105b. The first wiper blade 105a and the second wiper blade 105b may be arranged to be in parallel. Further, the wiper arm assembly 104 comprises a blade guide 105c connecting a distal end portion of the first wiper blade 105a to a proximal end portion of the second wiper blade 105b. The wiper arm body 108 comprises a first retainer 109a adapted to be connected to the wiper arm head 107 through the first retainer connection assembly 130a, and a second retainer 109b adapted to be connected to the wiper arm head 107 through the second retainer connection assembly 130b. Further, the wiper arm assembly 104 comprises a first elongated spring 110a arranged between the first retainer connection assembly 130a and the first wiper blade 105a, which may be adapted to wipe a first wiping zone 106a of a windshield 101; and a second elongated spring member 110b may be arranged between the second retainer connection assembly 103b and a second wiper blade 105b via a wiper rod 111 and an adapter 112. The second wiper blade 105b may be adapted to wiper a second wiping zone 106b of the windshield 101; the second wiping zone 106b is different from the first wiping zone 106a.

According to another embodiment of the present invention, there is also provided a motor vehicle including the above windshield cleaning system 100 having the wiper device 102 with a single wiper arm 104, which can accommodate two wiper blades 105a, 105b by using the wiper arm head 107 of the proposed invention.

The present invention is not limited in its implementation to the above-described embodiments. Rather, a number of variants, which make use of the described solution even for different configurations.

Although the present disclosure is provided with references to figures, all of the embodiments shown in figures are intended to explain the preferred embodiments of the present invention by ways of examples, instead of being intended to limit the present invention.

It should be apparent and would be appreciated by those skilled in the art that various changes or modifications may be made in the present disclosure without departing from the principles and spirit of the disclosure, which are intended to be covered by the present invention as long as these changes or modifications fall within the scope defined in the claims and their equivalents.

Any numerical values recited herein include all values from the lower value to the upper value in increments of one unit provided that there is a separation of at least two (2) units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values, which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

The term "consisting essentially" of to describe a combination shall include the elements, ingredients, components or steps identified, and such other elements ingredients, components or steps that do not materially affect the basic and novel characteristics of the combination.

LIST OF ELEMENT NUMBERS

Windshield cleaning system 100
Wiper device 102
Wiper arm shaft 103
Wiper arm assembly/wiper arm 104
Blade assembly 105
First wiper blade 105*a*
Second wiper blade 105*b*
Blade guide 105*c*
First wiping zone 106*a*
Second wiping zone 106*b*
Wiper arm head 107
Wiper arm main body 108
First retainer 109*a*
Second retainer 109*b*
First elongated spring member 110*a*
Second elongated spring member 110*b*
Wiper rod 111
Adapter 112
First hinge pin 113*a*
Second hinge pin 113*b*
First connecting means 114*a*
Second connecting means 114*b*
First spring pin 115*a*
Second spring pin 115*b*
Base end section of the wiper arm head 120*a*
Front-end section of the wiper arm head 120*b*
Body section of the wiper arm head 120*c*
Left and right side walls of the wiper arm head 120*d* and 120*e*
Drive shaft hole 125
First retainer connection assembly 130*a*
Second retainer connection assembly 130*b*
First protruding section 135*a*
Second protruding section 135*b*
First hinge shaft 140*a*
Second hinge shaft 140*b*
Through-hole of the first hinge shaft 150*a*
Through-hole of the second hinge shaft 150*b*
Pair of first arm sections 155*a*, 155*b*
Aperture on the first arm sections 160*a*
Aperture on the second arm sections 160*b*
Pair of first arm sections 165*a*, 165*b*
First holding means 170
Second holding means 175
Stopping means 180

What is claimed is:

1. A wiper arm head adapted to be connected to a wiper arm body, the wiper arm head comprises:
   a base end section, a front end section, and a body section having a pair of left and right side walls longitudinally extending from the base end section towards the front end section;
   a first retainer connection assembly and a second retainer connection assembly formed integrally with the wiper arm head and configured to connect the wiper arm head to the wiper arm body, which comprises a first retainer and a second retainer;
   wherein the first retainer connection assembly comprises a first protruding section protruding from the front end section and is formed with a first hinge shaft extending along its longitudinal direction from a first sidewall to a second sidewall of the first protruding section and it comprises a first through-hole to connect a proximal end portion of the first retainer with the wiper arm head through a first hinge pin disposed in the first through-hole; and
   wherein the second retainer connection assembly comprises a second protruding section protruding from the first protruding section and positioned downward of the first hinge shaft, and the second protruding section comprises: a second hinge shaft extending between a pair of second arm sections disposed at a predetermined interval, and having a second through-hole extending from one second arm section to the other second arm section through the second hinge shaft along its longitudinal direction to connect a proximal end portion of the second retainer with the wiper arm head through a second hinge pin disposed in the second through-hole.

2. The wiper arm head as claimed in claim 1, wherein the first retainer connection assembly further includes a pair of first arm sections disposed at a predetermined interval and protrudes from the front end face through the first protruding section and extends forward through the first hinge shaft, and wherein each first arm section is provided with a first aperture at a position deviated downward and rearward of the first hinge shaft to receive a first spring pin.

3. The wiper arm head as claimed in claim 2, wherein an arm section of the pair of first arm sections is positioned slightly inside the right sidewall of the body section and it is the first sidewall of the first protruding section.

4. The wiper arm head as claimed in claim 3, wherein another arm section of the pair of first arm sections is positioned in such a way that the second protruding section is formed at a position deviated sideward and rearward of the other arm section along a lateral direction of the first protruding section.

5. The wiper arm head as claimed in claim 2, wherein the first spring pin is positioned rearward and downward of the first hinge shaft.

6. The wiper arm head as claimed in claim 2, wherein the first retainer connection assembly further includes a first elongated spring member, which is housed in the first retainer, and wherein one end of the first elongated spring member is coupled to the first spring pin via a first connecting means and other end of the first elongated spring member is coupled to a distal end section of the first retainer.

7. The wiper arm head as claimed in claim 1, wherein the first and second sidewalls of the first protruding section extends forward from portions slightly inside of the right and left side walls of the body section of the wiper arm head to be in substantially parallel with the left and right and left sidewalls, respectively.

8. The wiper arm head as claimed in claim 1, wherein first protruding section extends forward from the front end section such that the sidewalls of the first protruding section are slightly inside the left and right side walls of the body section.

9. The wiper arm head as claimed in claim 1, wherein the second protruding section is formed slightly inside the second sidewall of the first protruding section.

10. The wiper arm head as claimed in claim 1, each second arm section is provided with a second aperture provided at a position deviated downward and rearward of the second hinge shaft to receive a second spring pin.

11. The wiper arm head as claimed in claim 10, wherein the second spring pin positioned rearward and downward of the second hinge shaft.

12. The wiper arm head as claimed in claim 10, wherein the second retainer connection assembly further comprises a second elongated spring member, which is housed in the second retainer, and wherein one end of the second elongated spring member is coupled to the second spring pin via a second connecting means and other end of the second elongated spring member is connected to an adapter via a wiper rod, wherein the second wiper blade is mounted to the adapter.

13. The wiper arm head as claimed in claim 1, wherein the second hinge shaft has a lesser longitudinal length compared to a longitudinal length of the first hinge shaft.

14. The wiper arm head as claimed in claim 1, wherein the second retainer is housed within the first retainer.

15. The wiper arm head as claimed in claim 1, wherein the base end section has an opening to receive a drive shaft.

16. The wiper arm head as claimed in claim 1, wherein the first retainer and the second retainer are of different types.

17. The wiper arm head as claimed in claim 1, wherein the first retainer connection assembly is configured to engage a first wiper blade against a first wiping zone of a windshield, and the second retainer connection assembly configured to engage a second wiper blade against a second wiping zone different from the first wiping zone.

\* \* \* \* \*